United States Patent [19]

Corbett

[11] Patent Number: 5,114,790
[45] Date of Patent: * May 19, 1992

[54] KEYBOARD WITH CONDUCTIVE RESILIENT PAD

[75] Inventor: Daniel P. Corbett, Bridgewater, Mass.

[73] Assignee: Acushnet Company, New Bedford, Mass.

[*] Notice: The portion of the term of this patent subsequent to Apr. 12, 2005 has been disclaimed.

[21] Appl. No.: 269,939

[22] Filed: Nov. 10, 1988

[51] Int. Cl.⁵ .................. B32B 9/00; B32B 27/08
[52] U.S. Cl. .................. 428/408; 428/517; 428/521; 428/542.8; 200/5 A; 525/187
[58] Field of Search ............ 428/408, 517, 521, 542.8; 200/5 A; 525/187

[56] References Cited

U.S. PATENT DOCUMENTS

| | | |
|---|---|---|
| 4,524,249 | 6/1985 | Farrell . |
| 4,537,825 | 8/1985 | Yardley . |
| 4,594,389 | 6/1986 | Lal et al. . |
| 4,737,412 | 4/1988 | Corbett et al. ............ 525/187 |

FOREIGN PATENT DOCUMENTS

| | | |
|---|---|---|
| 0717116 | 3/1978 | U.S.S.R. . |
| 1435524 | 5/1976 | United Kingdom . |

*Primary Examiner*—P. C. Sluby
*Attorney, Agent, or Firm*—Pennie & Edmonds

[57] ABSTRACT

A conductive resilient pad for keyboards, such as computer keyboards, is disclosed. The pad is composed of EPDM blended with a copolymer of propylene oxide and allyl glycidyl ether and Ketjen Black. Each of the polymers is present in the amount of about 25 to about 75 parts and the Ketjen Black is present in an amount of about 1 to about 30 parts.

8 Claims, 1 Drawing Sheet

KEYBOARD WITH CONDUCTIVE RESILIENT PAD

The present invention relates to keyboards and, in particular, to an improved conductive resilient pad for use in keyboards.

Keyboards are well-known structures. They are typically used in computers, calculators, electronic typewriters, telephones and the like. As is well-known, a conductive resilient pad is used between the keys and the microswitches or other activating devices. When a particular key is depressed, the function of the conductive pad is to form an electrical contact in the microswitch to complete a circuit while giving the user good "feel" and, at the same time, having the resilience to return the key to its original position. The pad serves the further function of keeping dust, water, and other contaminants from the operative part of the keyboard.

Conventional conductive keyboard pads have a two-piece construction comprising a resilient pad which is typically made from silicone rubber and a microdot of conducting rubber composition which is typically a combination of silicone rubber and carbon black. The pad provides the resilience needed for the conductive pad while the microdot provides the conductivity needed to close the microswitch or other activating device. A microdot of a conductive rubber is used instead of a typical conductor like metal because of the good adhesion which is obtained between the microdot and the resilient pad by covulcanization or bonding of the two.

FIG. 1 illustrates a conventional conductor keyboard pad 10 having silicone rubber pad 12 which has been covulcanized with microdot 14 of conductive rubber. Key 16 is positioned in keyboard 18. Key 16 is used to push conductive keyboard pad 10 down such that microdot 14 forms a contact across microswitch 20. The resilience in pad 12 causes key 16 to return to a rest position as shown in FIG. 1.

Carbon black is typically added to and mixed thoroughly with rubber compounds to provide increased durability to the rubber composition. In order for the microdot to conduct electricity, poor or incomplete mixing of the carbon black with the rubber composition is necessary. This incomplete mixing leads to inconsistency in the conductive rubber composition, which in turn leads to poor adhesion between the microdot and the pad. Additionally, the amount of carbon black used in the conductive microdot is much higher than conventional rubber compositions. Typically, the amount of conductive carbon black used in conductive rubber is 50 to 80 parts based on 100 parts by weight rubber (pphr). Conductive carbon black typically has a surface area of 254 $m^2/g$, DBP absorption of 180 ml/100 and a volatile content of 2.0%.

To make a conventional two-piece conductor keyboard pad such as pad 10 in FIG. 1, a thin microdot of uncured compound is died out and loaded into a multicavity production mold. Then, the mold is loaded with a second uncured non-conductive compound and the two materials are covulcanized and bonded under heat and pressure to produce a finished two-piece conductive keyboard pad.

Attempts have been made to produce a one-piece conductive keyboard pad; however, because of the restraints on thorough mixing and peak tactile force, the resulting conductive pads have very poor durability and black mark the circuitry. At present, conductive resilient keyboard pads are made in the two-piece manner described hereinabove.

Applicant has now discovered a new conductive non-silicone rubber composition which provides a conductive resilient pad of one-piece construction and uses less carbon black than conventional conductive rubber compositions. Such one-piece construction alleviates the need for the use of a microdot, greatly reduces cost and simplifies construction of conductive keyboard pads. The conductive rubber composition of the present invention uses less than 30 pphr of carbon black and allows for thorough mixing of the rubber composition thereby providing consistency in the composition as well as good physical properties and peak tactile force values.

Applicant has discovered that a one-piece conductive keyboard pad having excellent resilience and excellent flex life can be made from a rubber composition comprising a rubber blend EPDM and a copolymer of propylene oxide and allyl glycidyl ether; and about 30 pphr or less of a carbon black having a BET ($N_2$) surface area between about 700 to about 1500 $m^2/g$ and a bulk density between about 100 to about 200 g/l. One such copolymer of propylene oxide and allyl glycidyl ether is sold under the trademark Parel by Hercules. AKZO Chemie of America and Noury Chemicals sell such a carbon black under the trademarks Ketjen Black EC300J and Ketjen Black EC600 (hereinafter collectively referred to as Ketjen Black unless followed by a numerical description).

It is surprising that such a low amount of carbon black can be used to make a conductive keyboard pad. It is also surprising that such a composition can be thoroughly mixed and still produce a conductive rubber pad.

U.S. Pat. No. 4,737,412 dated Apr. 12, 1988, of which applicant is a coinventor, teaches the use of a blend of EPDM and Parel for a keyboard pad. Such a blend ranges between 90:10 to 10:90 with a preferred blend in the range of 60:40 to 40:60. The teachings of the '412 patent are incorporated herein by reference.

FIG. 1 illustrates a conventional two-piece conductive keyboard pad; while

Figure 1:
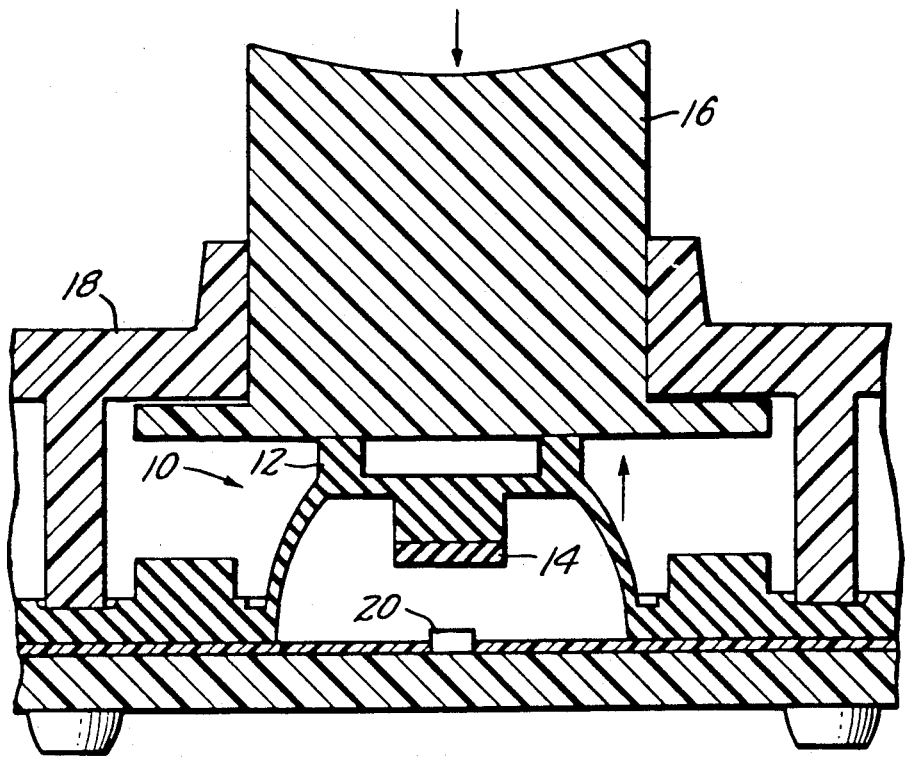

The amount of EPDM in the conductive keyboard pad of the present invention is suitably between about 25 to about 75 pphr and the amount of Parel in the conductive keyboard pad of the present invention is suitably about 75 to about 25 pphr. Suitably, about 1 to about 30 pphr of Ketjen Black is used. The preferred amount of Ketjen Black used in the instant invention depends upon the surface area of the Ketjen Black. The larger the surface area, the less Ketjen Black necessary, while the smaller the surface area, the more Ketjen Black necessary. Preferably, the conductive keyboard pad of the present invention comprises about 40 to about 60 pphr of EPDM, about 60 to about 40 pphr of Parel, and about 5 to about 20 pphr of Ketjen Black. Best results have been obtained when using about 50 pphr of EPDM, 50 pphr of Parel and either about 10 pphr of Ketjen Black EC300J or 15 pphr of Ketjen Black EC600.

Ketjen Black EC300J has a BET ($N_2$) surface area of about 800 $m^2/g$ and a bulk density of about 145 g/l. Ketjen Black EC600 has a BET ($N_2$) surface area of about 1250 $m^2/g$ and a bulk density of about 115 g/l.

The term EPDM as used herein is a common industry term which refers to a terpolymer of an ethylene, propylene and diene monomer. In the terpolymer, the diene is present in a comparatively small amount. Various dienes are in common commercial use including, for example, 1,4 hexadiene; ethylidene norbornene; and dicyclopentadiene. Of these, it is preferred to use the 1,4 hexadiene such as is present in DuPont's EPDM polymer sold under the name Nordel 1470.

As in normal rubber processing, the formulation includes accelerators, typically sulfur compounds. Suitable accelerators include zinc dibutyldithiocarbamate, tetramethylthiuram disulfide, N-t-butyl-2 benzothiazl sulfenamide and similar, known accelerators. The formulation can further include antioxidants, e.g. nickel, dibutyldithiocarbamate or polymerized 2,2,4-trimethyl-1,2-dihydroquinoline; activators, e.g. a metal oxide such as zinc oxide or magnesium oxide; curing agents, e.g. a higher fatty acid such as stearic acid; and sulfur. Listed below are preferred and typical levels for the various ingredients. The total amount of rubber, i.e. the combination of EPDM and Parel copolymer, is 100 parts. The other ingredients are listed in parts by weight per 100 parts of the rubber component (pphr).

| Ingredient | Typical Range | Preferred Range |
|---|---|---|
| EPDM | 25-75 | 40-60 |
| Parel copolymer | 25-75 | 40-60 |
| Antioxidant | 1-3 | 1 |
| Curing agent | 0.75-1.5 | 1 |
| Activator | 3-25 | 10-20 |
| Stearic Acid | 0.5-1.5 | 1 |
| Accelerators | 2-5 | 2-3 |
| Sulfur | 0-3 | 1-2 |
| Ketjen Black | 1-30 | 5-20 |
| Process Aid (EZ mix) | 1-3.5 | 1-2 |
| Plasticizers | 5-20 | 5-10 |

In addition to the above-listed ingredients, the formulation can include other ingredients; for example, an additional rubber material such as polyisoprene or polybutadiene may be employed. If an additional rubber material is employed, it is preferred that it not be present in an amount greater than 15 parts by weight of the EPDM-Parel copolymer content. Other ingredients commonly used in rubber formulations can also be employed such as cure retarders and the like.

In forming the pad of the present invention, the two rubber materials, i.e. the EPDM and the Parel copolymer, are first mechanically mixed to homogenize them. It has been found to be important to mix for a sufficient period of time at an elevated temperature to obtain substantially complete homogenization of the two materials. It has been found that this can be accomplished by mixing the two materials in a Banbury mixer at about 150°-200° F. for two minutes. After the two polymers have been blended together, Ketjen Black and the other ingredients except for the accelerators and sulfur are added to the Banbury mixer. The other ingredients are preferably added sequentially in order to insure good mixing in accordance with normal rubber processing procedures. The addition of the further materials suitably takes place at a temperature of up to about 300° F. and is suitably over a period of four minutes.

After the completion of the first stage, i.e. the mixing of all of the ingredients except for the accelerators and the sulfur (if present), the material is cooled. It is then mixed again, suitably in a Banbury mixer, for 2-3 minutes at a temperature of up to about 200° F. with the addition of the accelerators and sulfur. The mixed material is then made into a preform, suitably by extrusion. The extruded preform is then made into the appropriate shape for the particular pad application, suitably by transfer, injection, or compression molding. The part is preferably post cured after molding, suitably at about 225° F. for about two hours.

These and other aspects of the present invention are illustrated in the following examples:

EXAMPLE 1

This example illustrates two formulations of the conductive key pad of the present invention. In this example the formulation consisted of the following ingredients with each of the ingredients being listed as parts by weight based on the total rubber content:

| Ingredient | A (PPHR) | B (PPHR) |
|---|---|---|
| EPDM | 50 | 50 |
| Parel copolymer | 50 | 50 |
| Nickel dibutyldithiocarbamate | 0.5 | 0.5 |
| Polymerized 2,2,4-trimethyl-1,2-dihydroquinoline | 0.5 | 0.5 |
| Stearic acid | 1 | 1 |
| Zinc oxide | 15 | 15 |
| Zinc dibutyldithiocarbamate | 1 | 1 |
| Tetramethylthiuram disulfide | 0.25 | 0.25 |
| N-t-butyl-2 benzothiazl sulfenamide | 1 | 1 |
| Spider sulfur | 1.5 | 1.5 |
| Ketjen Black EC600 | 15 | — |
| Ketjen Black EC300J | — | 10 |
| Sundex* 790 | | 10 |

*Sundex is an aromatic oil sold by the Sun Oil Company.

In both formulations, the EPDM and Parel copolymer were mixed in a Banbury mixer for two minutes and the temperature rose to about 200° F. during the mixing. The antioxidant, stearic acid, zinc oxide, and Ketjen Black were added sequentially and mixing was continued for another four minutes and the temperature rose to about 300° F. The material was subsequently reintroduced to the Banbury mixer and was mixed for two minutes at a temperature below about 200° F. During this mixing the accelerators (zinc dibutyldithiocarbamate, tetramethylthiuram disulfide, and N-t-butyl-2 benzothiazl sulfenamide) and the sulfur (spider sulfur) were added. After removal from the Banbury mixer, the mixture was extruded into a suitable preform and the preform was then formed into a keyboard pad in a transfer molding operation. The keyboard pad was cured for two minutes at 350°-360° F.

The finished pads had the following physical properties:

| Property | A | B |
|---|---|---|
| Specific gravity | 1.32 | 1.09 |
| Hardness, Shore A | 70 | 56 |
| Tensile strength | above 1740 psi | above 920 psi |
| Elongation | above 430% | above 520% |
| Elastic modulus | | |
| at 100% | above 150 | above 170 |
| at 200% | above 240 | above 275 |
| at 300% | above 370 | above 370 |

The pads were measured for change in peak tactile between compression and relaxation to determine the hysteresis loss of the rubber. The value is expressed as grams and indicates the resilience of the material. A material with complete resilience has a value of 0 grams. Pad A of this example was found to have a value of 75 grams while pad B was found to have a value of 14 grams.

The pads were also found to have excellent flex life. In fact, it was found that these pads had had a life cycle of over 45 million. Typically, conventional two-piece conductive keyboard pads have a life cycle of about 1 million. A life cycle is the number of times the pad can be compressed and bounced back before failure.

Additionally, it was found that pad A had a resistivity value of 4 ohm-cm and pad B had a resistivity value of 135 to 180 ohm-cm. Conventional two-piece conductive keyboard pads have a conductivity of about $1-10^{-5}$ ohm-cm.

Figure 2:
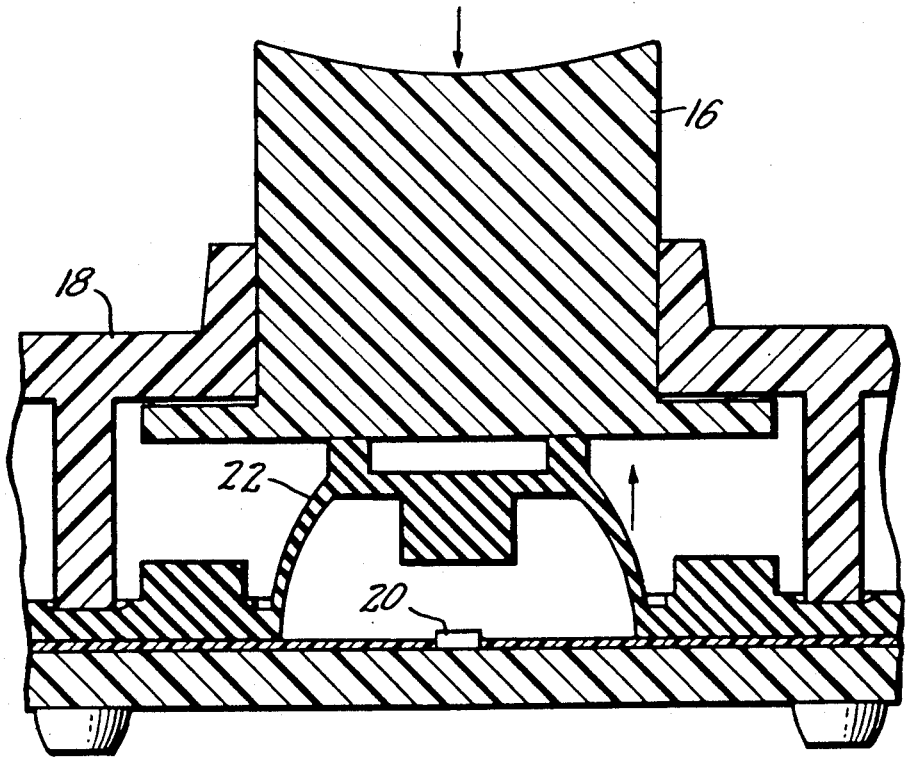
FIG. 2 illustrates a one-piece conductive keyboard pad of the present invention.

FIG. 2 illustrates the pad of the present invention, pad 22, placed in a conventional keyboard.

EXAMPLE 2

Example 1 is repeated using 25 pphr EPDM and 75 pphr Parel copolymer and 1 pphr of Ketjen Black. Acceptable results are obtained.

EXAMPLE 3

Example 1 is repeated using 75 pphr EPDM and 25 pphr Parel copolymer and 30 pphr of Ketjen Black. Acceptable results are obtained.

EXAMPLE 4

Example 1 is repeated using 40 pphr EPDM, 60 pphr Parel copolymer and 5 pphr of Ketjen Black. Results comparable to those of Example 1 are obtained.

EXAMPLE 5

Example 1 is repeated using 60 parts EPDM, 40 parts Parel copolymer and 20 pphr of Ketjen Black. Results comparable to those of Example 1 are obtained.

It will be understood that the claims are intended to cover all changes and modifications of the preferred embodiment of the invention herein chosen for the purpose of illustration which do not constitute departure from the spirit and scope of the invention.

What is claimed is:

1. In a keyboard having activation devices activated by keys and having a conductive resilient pad between said keys and said activation device, the improvement comprising a one-piece conductive resilient pad comprising about 25 to about 75 parts of an ethylene-propylene terpolymer; about 75 to about 25 parts of a copolymer of propylene oxide and allyl glycidyl ether; and about 1 to about 30 parts of a carbon black having a BET ($N_2$) surface area between about 700 and about 1500 m$^2$/g and a bulk density between about 100 and about 200 g/l.

2. The keyboard of claim 1 wherein said conductive resilient pad comprises the following ingredients in parts by weight per hundred parts of the content of said ethylene-propylene terpolymer-copolymer of propylene oxide and ally glycidyl ether:

| Ingredient | PPHR |
| --- | --- |
| [EPDM | 25-75] |
| Ethylene-propylene terpolymer | 25-75 |
| Copolymer of propylene oxide and allyl glycidyl ether | 25-75 |
| Antioxidant | 1-3 |
| Curing agent | 0.75-1.5 |
| Activator | 3-25 |
| Accelerators | 2-5 |
| Sulfur | 0-3 |
| [Ketjen Black | 1-30] |
| Carbon black having a BET ($N_2$) surface area between about 700 and about 1500 m$^2$/g and a bulk density between about 100 and about 200 g/l | 1-30 |

3. The keyboard of claim 1 wherein said conductive resilient pad comprises the following ingredients in parts by weight per hundred parts of the content of said ethylene-propylene terpolymer-copolymer of propylene oxide and allyl glycidyl ether:

| Ingredient | PPHR |
| --- | --- |
| [EPDM | 40-60] |
| Ethylene-propylene terpolymer | 40-60 |
| Copolymer of propylene oxide and allyl glycidyl ether | 40-60 |
| Antioxidant | 1 |
| Curing agent | 1 |
| Activator | 10-20 |
| Accelerators | 2-3 |
| Sulfur | 1-2 |
| [Ketjen Black | 5-20] |
| Carbon black having a BET ($N_2$) surface area between about 700 and about 1500 m$^2$/g and a bulk density between about 100 and about 200 g/l | 5-20 |

4. The keyboard of claim 1 wherein said conductive resilient pad comprises the following ingredients in parts by weight per hundred parts of the content of said ethylene-propylene terpolymer-copolymer of propylene oxide and allyl glycidyl ether:

| Ingredient | PPHR |
| --- | --- |
| [EPDM | 50] |
| Ethylene-propylene terpolymer | 50 |
| Copolymer of propylene oxide and allyl glycidyl ether | 50 |
| Nickel dibutyldithiocarbamate | 0.5 |
| Polymerized 2,2,4-trimethyl-1,2 dihydroquinoline | 0.5 |
| Stearic acid | 1 |
| Zinc oxide | 15 |
| Zinc dibutyldithiocarbamate | 1 |
| Tetramethylthiuram disulfide | 0.25 |
| 2-mercaptobenzothiazole | 1 |
| Spider sulfur | 1.5 |
| Either: | |
| [Ketjen Black EC300J | 10 |
| or | |
| Ketjen Black EC600 | 15] |
| Carbon black having a BET ($N_2$) surface area of about 800 m$^2$/g and a bulk density of about 145 g/l | 10 |
| or | |

| Ingredient | PPHR |
| --- | --- |
| Carbon black having a BET (N$_2$) surface area of about 1250 m$^2$/g and a bulk density of about 115 g/l | 15 |

5. In a keyboard having activation devices activated by keys and having a conductive resilient pad between said keys and said activation device, the improvement comprising a one-piece conductive resilient pad comprising about 25 to about 75 parts of an ethylene-propylene terpolymer; about 75 to about 25 parts of a copolymer of propylene oxide and allyl glycidyl ether; and about 1 to about 30 parts of a carbon black having a BET (N$_2$) surface area between about 700 and about 1500 m$^2$/g and a bulk density between about 100 to about 200 g/l.

6. The keyboard of claim 5 wherein said conductive resilient pad comprises the following ingredients in parts by weight per hundred parts of the content of said ethylene-propylene terpolymer-copolymer of propylene oxide and allyl glycidyl ether:

| Ingredient | PPHR |
| --- | --- |
| Ethylene-propylene terpolymer | 25-75 |
| Copolymer of propylene oxide and allyl glycidyl ether | 25-75 |
| Antioxidant | 1-3 |
| Curing agent | 0.75-1.5 |
| Activator | 3-25 |
| Accelerators | 2-5 |
| Sulfur | 0-3 |
| Carbon black having a BET (N$_2$) surface area between about 700 and about 1500 m$^2$/g and a bulk density between about 100 and about 200 g/l | 1-30 |

7. The keyboard of claim 5 wherein said conductive resilient pad comprises the following ingredients in parts by weight per hundred parts of the content of said ethylene-propylene terpolymer-copolymer of propylene oxide and allyl glycidyl ether:

| Ingredient | PPHR |
| --- | --- |
| Ethylene-propylene terpolymer | 40-60 |
| Copolymer of propylene oxide and allyl glycidyl ether | 40-60 |
| Antioxidant | 1 |
| Curing agent | 1 |
| Activator | 10-20 |
| Accelerators | 2-3 |
| Sulfur | 1-2 |
| Carbon black having a BET (N$_2$) surface area between about 700 and about 1500 m$^2$/g and a bulk density between about 100 and about 200 g/l | 5-20 |

8. The keyboard of claim 5 wherein said conductive resilient pad comprises the following ingredients in parts by weight per hundred parts of the content of said ethylene-propylene terpolymer-copolymer of propylene oxide and allyl glycidyl ether:

| Ingredient | PPHR |
| --- | --- |
| Ethylene-propylene terpolymer | 50 |
| Copolymer of propylene oxide and allyl glycidyl ether | 50 |
| Nickel dibutyldithiocarbamate | 0.5 |
| Polymerized 2,2,4-trimethyl-1,2 dihydroquinoline | 0.5 |
| Stearic acid | 1 |
| Zinc oxide | 15 |
| Zinc dibutyldithiocarbamate | 1 |
| Tetramethylthiuram disulfide | 0.25 |
| 2-mercaptobenzothiazole | 1 |
| Spider sulfur | 1.5 |
| Either: | |
| Carbon black having a BET (N$_2$) surface area of about 800 m$^2$/g and a bulk density of about 145 g/l | 10 |
| or | |
| Carbon black having a BET (N$_2$) surface area of about 1250 m$^2$/g and a bulk density of about 115 g/l | 15 |

* * * * *